United States Patent [19]
Orlando et al.

[11] 3,941,047
[45] Mar. 2, 1976

[54] COTTON MODULE BUILDER

[75] Inventors: Franklin P. Orlando, San Jose; Johan Hendriks, Saratoga, both of Calif.

[73] Assignee: FMC Corporation, San Jose, Calif.

[22] Filed: Mar. 3, 1975

[21] Appl. No.: 554,885

[52] U.S. Cl. ............... 100/100; 100/214; 100/218; 100/226; 100/269 R; 214/9; 280/81 R
[51] Int. Cl.² ..................... B30B 1/32; B30B 15/32
[58] Field of Search .... 214/9; 100/100, 226, 229 R, 100/218, 215, 214, 269 R; 280/81 R; 130/20

[56] References Cited
UNITED STATES PATENTS

| | | | |
|---|---|---|---|
| 1,839,577 | 1/1932 | Moreland | 280/81 R |
| 2,932,299 | 4/1960 | Brandt et al. | 130/20 |
| 3,057,359 | 10/1962 | Schonert | 130/20 |
| 3,691,967 | 9/1972 | Mettetal | 100/100 |
| 3,703,966 | 11/1972 | Jones et al. | 100/100 |
| 3,749,003 | 7/1973 | Wilkes et al. | 100/100 |
| 3,896,720 | 7/1975 | Rhodes | 100/226 |

*Primary Examiner*—Billy J. Wilhite
*Attorney, Agent, or Firm*—R. S. Kelly; J. F. Schipper; C. E. Tripp

[57] ABSTRACT

The cotton module builder comprises a mobile, open-bottomed rectangular frame structure into which field cotton can be deposited. A compacting mechanism is mounted at the open top of the frame structure in order to compress the cotton therein into a compact, self-supporting stack (or module) which can be left in the field when the module builder is moved to a new location. The stack can then be picked up later and transported to a cotton gin.

An improved side frame structure for the module builder increases the structural rigidity thereof and includes a continuous side wall beam of triangular cross sectional configuration interconnecting the side wall struts. This beam provides high torsional resistance and minimizes the horizontal deflections at the base of the vehicle, especially when the rear door of the module builder is open as when the stack or module of cotton is being deposited in the field. Each side frame structure also includes a "walking beam suspension" support for the wheels which allows transport of the module builder over rough or hilly terrain.

13 Claims, 12 Drawing Figures

COTTON MODULE BUILDER

BACKGROUND OF THE INVENTION

1. Field of the Invention

The present invention pertains to load-carrying, movable structures, and more particularly it pertains to apparatus for stacking or ricking cotton or the like.

2. Description of the Prior Art

Until rather recently, cotton was usually picked by a mechanical harvester, loaded in wagons, and transported to the gin for subsequent processing. This resulted in a glut of activity at the gin during or shortly after harvesting time and a dearth of gin activity during the remainder of the year. The cotton module builder, as disclosed in U.S. Pat. No. 3,749,003 to Wilkes et al., was developed in part to allow the formation of large modules of cotton (sometimes twenty thousand pounds or more) in the cotton fields, which modules are of uniformly high density and may be temporarily stored where they lie until it is convenient to transport them to the gin. This allows inter alia a spacing out of the gin activities, with a consequent savings in cost resulting from the extension of the ginning season.

The cotton module builder generally comprises a rectangular frame structure which is open at the top and bottom and which is provided with collapsible wheels so that it can be transported to and from the fields where the cotton is harvested. At a suitable location the frame structure is lowered relative to the wheels so that it can be brought into engagement with the ground in closely spaced surrounding relationship to a flat pallet which rests upon the ground surface. The cotton which is harvested is dumped into the open body of the module builder upon the underlying pallet. A carriage containing a vertically reciprocable tamper is mounted upon the top of the frame structure so that the cotton can be continuously compressed into a firm, self-supporting stack or module, within the confines of the frame structure. When the cotton module is completed, the rear gate of the apparatus is opened and the wheels are extended to allow the module builder to be pulled forwardly to a new location leaving the compressed cotton on the pallet for temporary field storage.

In the module builder as conventionally constructed, the rear gate of the machine is a critical element in maintaining the structural integrity of the machine. When the tail gate pins (normally in shear, when the module builder is loaded with cotton) are removed and the rear gate is opened, the machine becomes essentially a three-sided open structure as it has no elements connecting the side frame members on the bottom thereof (in contact with the ground). One result of this is low torsional resistance in the module builder structure when the rear gate is opened, which circumstance is aggravated by the presence of a full load of tamped cotton within the builder. This also gives rise to substantial horizontal deflections at the base of the machine with the load of tamped cotton in place. The high torsional forces generated by the compressed cotton occasionally result in buckling or cracking of the structure at the corners thereof. Further, the opening and closing of the rear door with a tamped cotton load in place is often difficult as the rear door tends to "bind" due to various bending stresses. Finally, even with the rear door closed, changes in lateral wheelbase (center-to-center distance of parallel tires on the machine) can occur, thus presenting a safety hazard at even a 20 mile per hour towing speed.

One further problem, related to the transport of the module builder, occurs when the unit is moved over uneven or undulatory ground. The main frame, if attached rigidly to the wheel structure, will tend to rock back and forth and to "bottom" or bump along the ground as it moves, due to the uneven terrain.

SUMMARY OF THE INVENTION

This invention relates to improvements in the construction of the cotton module builder frame and carriage means particularly as shown in the aforementioned U.S. Pat. No. 3,749,003 to Wilkes et al. One object of this invention is to provide a module builder frame with increased structural integrity having high torsional resistance even with the rear door open.

A second object of this invention is to provide a module builder structure that will reduce or eliminate the large horizontal deflections at the base of the frame structure which may particularly occur when the rear door is open.

A third object of this invention is to provide a module builder structure wherein the rear door may be opened and closed easily with a tamped cotton load in place.

A fourth object of this invention is to reduce or eliminate the danger of lateral wheelbase changes in a cotton module builder while the machine is being towed on the road.

A fifth object is to provide a vertical differential apparatus for raising and lowering the module builder wheels which allows the wheels on either side to move vertically relative to one another, for ease of movement in rough or hilly terrain.

The first four recited objects are accomplished by use of triangular box beams which form the upper portion of the front wall, rear wall and each side wall on the builder. These beams are rigidly attached to one another and to web beams in the lower portion of the side walls. Such an arrangement results in increased torsional resistance and increased bending moment resistance of the structure.

The fifth recited object is accomplished, as part of the preferred embodiment, by a walking suspension beam construction, wherein the two wheels on each side of the module builder are rotatably connected by vertical bars to a rotatable, generally horizontal beam which is, in turn, connected by a pivotable connection to a hydraulic jack or other powered lift means attached to each side of the frame. The vertical bars connected to the wheels are constrained to move only vertically, so that the two wheels on either side may move independently of one another in a vertical direction (only). This allows the wheels to "walk" over obstructions or abrupt changes in elevation such as might be encountered in a furrowed field or other rough or hilly terrain.

DESCRIPTION OF THE DRAWINGS

FIG. 9 is an isometric view of the compacting apparatus located atop the module builder with the supporting structure therefor being shown in phantom lines;

DESCRIPTION OF THE PREFERRED EMBODIMENT

Figures 1, 2, 10, 11:
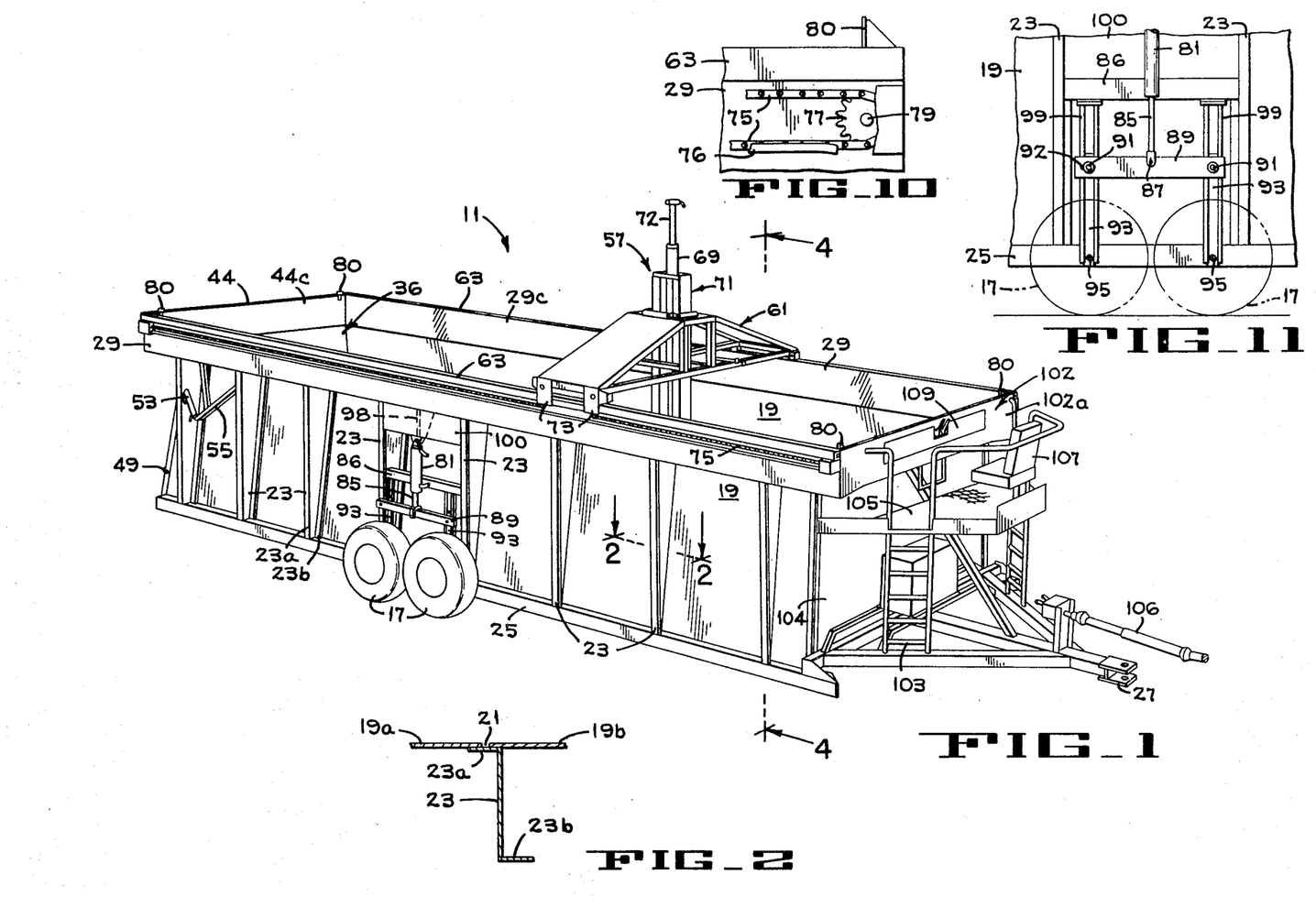
FIG. 1 is a front perspective view of the module builder of the present invention showing the frame in raised position with the wheels down.
FIG. 2 is an enlarged section taken on line 2—2 of FIG. 1 illustrating the structure of one of the web beams which brace the sides of the module builder.
FIG. 10 is an enlarged view of the chain drive means for the compacting apparatus located at the front corner of the module builder with portions of the cover structure being broken away for the purpose of clarity.
FIG. 11 is a side elevation of one of the wheel suspension means for raising and lowering the module builder.
Figure 3:
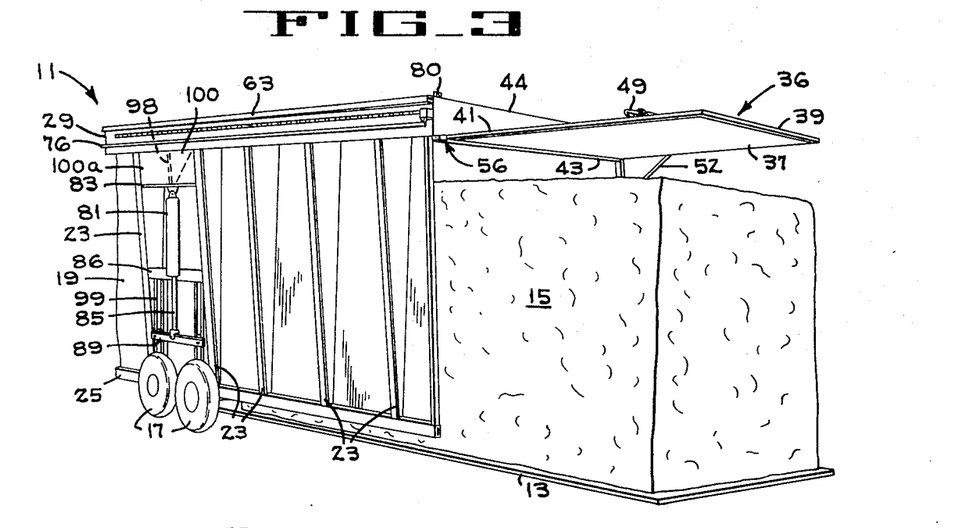
FIG. 3 is a partial rear perspective view of the module builder of FIG. 1 showing the apparatus being pulled away to leave a completed cotton module on the underlying pallet.
Figure 4:
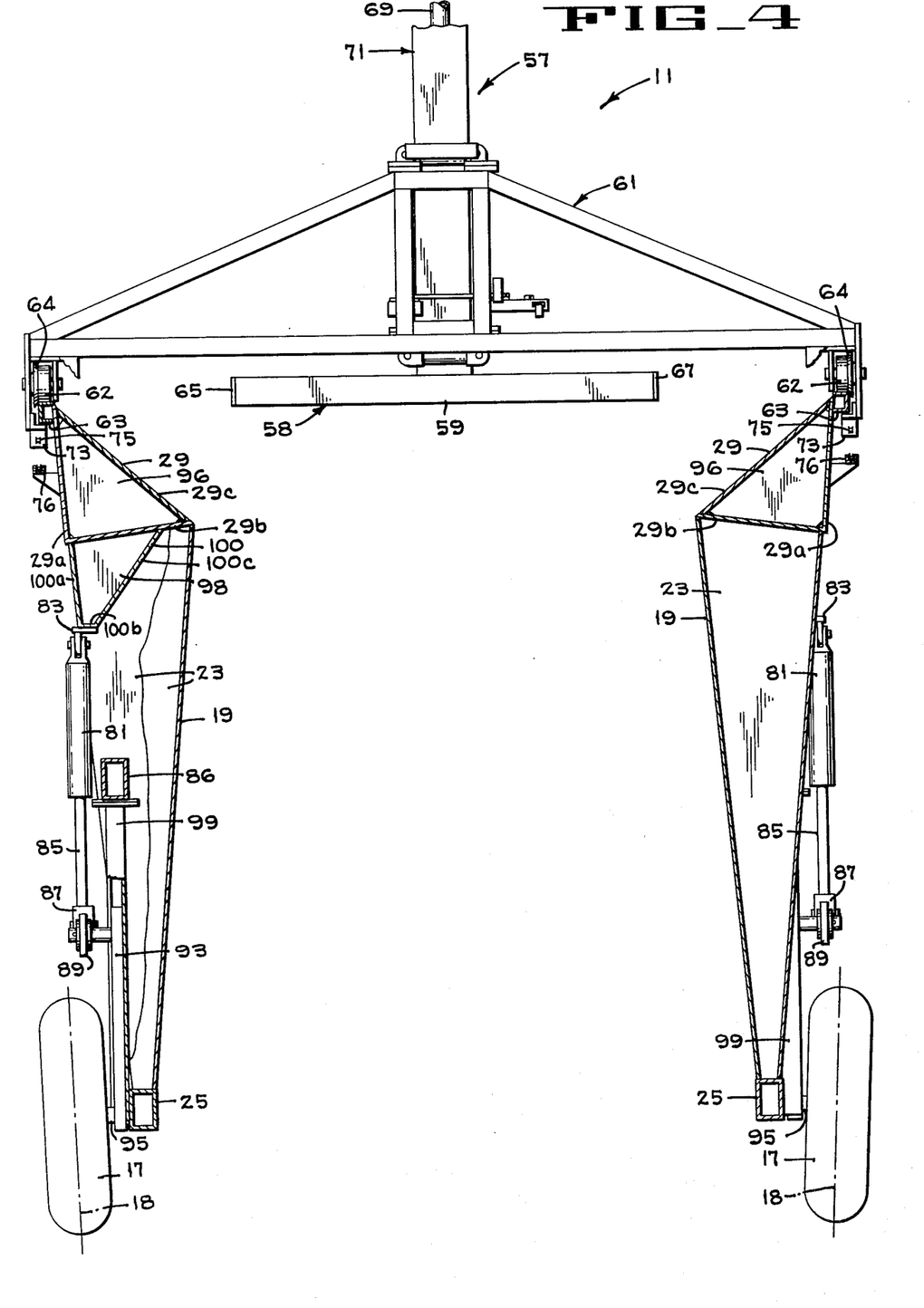
FIG. 4 is an enlarged transverse section taken on line 4—4 of FIG. 1 looking rearwardly along the longitudinal axis of the module builder.

Referring to FIG. 1, the module builder 11 of the present invention will be seen to comprise a generally rectangular open-topped frame structure. As shown in FIG. 3, the module builder is arranged to work cooperatively with a pallet 13 to produce a compressed module of cotton 15 on the pallet. FIGS. 1 and 3 show the module builder with its wheels 17 lowered, so that the apparatus may be pulled by a tractor or other vehicle (not shown) attached to a hitch 27 at the front of the builder. The major portion of each side frame comprises a wall 19 which walls slope toward one another at the top, so that the walls are further apart at the bottom of the frame than at the top, as indicated in FIG. 4. The side walls are interconnected at the rearward end of the module builder by a door 36, mounted for upward pivotable movement at its upper edge, and by a closed triangular box beam 44 acting as a header plate (FIG. 6) above the door. The inside surfaces of these opposed walls 19 are preferably smooth so as not to catch and snag the cotton. The walls should be constructed of a material, such as sheet metal, with elastic stiffness sufficient to resist the lateral forces exerted upon the side walls by the tamped cotton.

Figure 6:
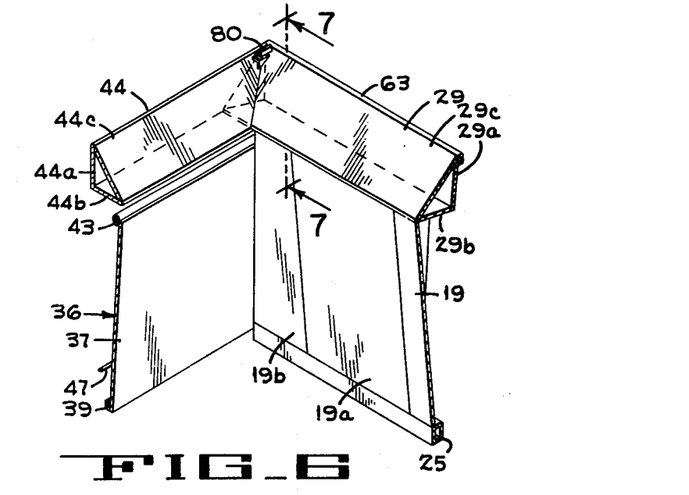
FIG. 6 is a perspective of a rear interior corner of the module builder, indicating the connection at one of the side and rear triangular box beams.

Each side frame structure also contains solid web beams 23 extending outwardly of and laterally of the side walls and having inner and outer flanges 23a and 23b respectively (FIG. 2) for further lateral strengthening of the side walls. As indicated in FIGS. 2 and 6, the side frame walls 19 are provided by a plurality of separate panels, and two consecutive panels 19a and 19b (FIG. 2) are tied together by a web beam 23 which is welded by its inner flange 23a onto each of the adjacent panels 19a and 19b so as to leave only a small gap 21 (approximately one-half inch) between the contiguous edges of the panels. Longitudinal runners 25 (FIGS. 1 and 4) of rectangular box beam cross section are located at the bottom of each of the side frame structures and are welded to the lower edges of the side walls 19 and web beams 23 to further tie the web beams and side walls together; these longitudinal runners make contact with the ground when the wheels 17 are raised (in a manner to be described in greater detail hereinafter).

Attached to the upper portion of each of the side walls 19 is a closed triangular box beam 29 that is comprised of three interconnected walls 29a, 29b, and 29c running the length of the module builder. The upper portion of the inner side wall 29c of the triangular box beam 29 is sloped inwardly as shown in FIG. 4 to act, in effect, as a funnel in directing the cotton, deposited from above, into the bin or compacting area of the module builder. The web beam 23 is welded to the underside of the bottom wall 29b of the triangular box beam 29 to further tie web beam, upper triangular box beam 29 and lower side wall 19 together. The presence of the closed triangular beam 29 acts to increase the torsional resistance of the entire side wall structure, and also to stiffen the module builder structure when the door 36 (FIG. 3) is in its opened position, so as to prevent binding of the door.

The torsional resistance of the frame provided by the box beams 29 is proportional to the total enclosed cross sectional area of these beams. The torsional and bending loads are transmitted from side wall beams 29 to end wall beam 44 through the use of an efficient corner design, and cracking or buckling of the structure at the corners of the side wall beams 29 (FIG. 4) is prevented.

The continuously formed triangular box beams 29 and 44 may be viewed as thin-walled tubes of wall thickness t. In the theory of mechanical deformation of elastic solids (see, for example, S. Crandall and N. Dahl, eds., *An Introduction to the Mechanics of Solids*, McGraw — Hill, 1959, pp. 267–70), it is found that the circumferential shear stress $T_{\theta z}$ developed in such a tube due to application of a twisting moment $M$ (torsion) applied to the tube is given to a good approximation by $$2AtT_{\theta z} = M,$$

where $t$ = tube thickness, and $A$ = area enclosed by tube cross-section

For a given magnitude $T_{\theta z}$ (for example, the limit shear stress, beyond which non-elastic yield occurs), the allowable moment or torsional resistance is proportional to the area enclosed and also proportional to the wall thickness of the beam or tube. An increase in tube wall thickness $t$ thus allows a proportional increase in torsional resistance of the structure; however, this carries with it a proportional weight penalty. Further, if the triangular beam is made sufficiently thick, the weight of this beam, if used as contemplated in the cotton module builder, will result in significant bending moments. This is due to the cantilever effect of the beam, if hung as shown in FIG. 4, relative to the central part of the cotton module builder structure.

These disadvantages are avoided or minimized if the enclosed cross-sectional area A, rather than the beam wall thickness $t$, is increased. The weight penalty is modest, the bending moments remain low, and there is a marked gain in torsional stiffness of the structure.

It is important to note that this use contemplates a closed beam structure with no gaps or cuts. The torsional resistance of a cylinder with a longitudinally extending cut or slit is reduced to 2.8% (i.e. by a factor of 36) of the torsional resistance of a similar closed tube (see R. J. Roark, *Formulas for Stress and Strain*, McGraw-Hill, 4th Ed., 1965, pp. 193–200). The response of a triangular beam (a "tube") with a cut or gap in the sidewall is analogous—the torsional resistance is reduced by nearly two orders of magnitude. Thus, for example, an open beam comprised of merely two sides of a triangle would offer little improvement in torsional resistance over a structure in which this type of beam is absent.

The pallet 13 (FIG. 3), if used, should have a width slightly less than the distance between the two parallel runners 25. The pallet may have any convenient length, but it should be at least as long as the bed of the module builder. An alternative approach allows the pallet to be dispensed with so that the compressed cotton module can be built, or ricked, directly upon the ground.

Figure 5:
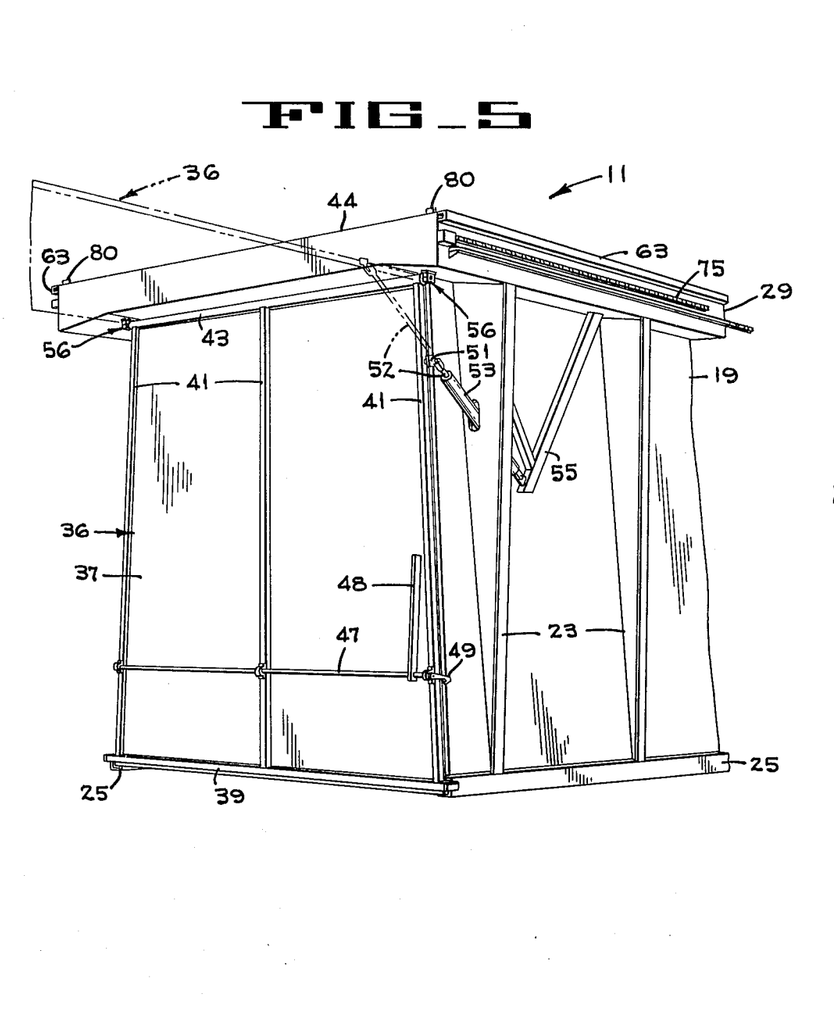
FIG. 5 is a perspective view of the rear portion of the module builder illustrating the rear door in its closed (full line) and open (phantom line) conditions.

Referring to FIG. 5, the rear door of the module builder comprises a vertical panel 37 bounded by and welded to a lateral runner 39 and a torsion tube 43 at the bottom and top, respectively, and welded to spaced vertical braces 41 for additional stiffness and structural integrity. In the preferred embodiment, the tube 43 is a thick-walled cylindrical tube which functions as a pivot for the door and as a torsion tube to support a portion of the door and minimize door "sag" when the door is in the open position. A hydraulic jack 53 includes a piston rod 52 which is attached to a rotatable connection 51 at one of the upper side edges of the door (FIG. 5), the jack being mounted upon a brace 55 attached to the adjacent side wall 19. The jack serves to raise and lower the rear door of the builder for the purpose of depositing the completed module and movement of the builder to another location, as suggested in FIG. 3. Owing to use of the torsion tube 43 which can apply a torsional force to support half of the door, only one such hydraulic jack 53 need be used, rather than one on each side of the door. This results in a simplification of the door opening and closing operations, as it does not require the coordinated operation of two such jacks. In its closed position, the rear door is secured by a leverage bar 48 which is attached to a rod 47 that extends across the width of the door and is provided at its ends with a pair of latches 49. The rod 47 is mounted for rotation, as shown in FIG. 5, and the latches 49 are arranged to engage pins on the adjacent side wall structures.

Figure 8:
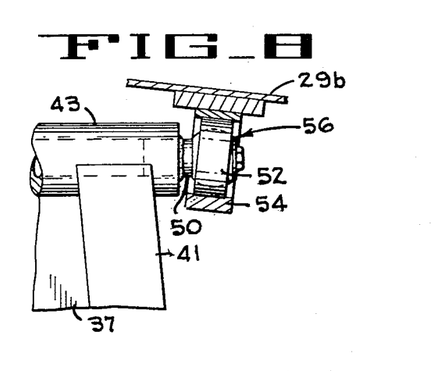
FIG. 8 is an enlarged detail view, partially in section, of one of the upper pivotal mountings for the rear door of the module builder as shown in FIG. 5.

FIG. 8 is an end view of one of the pivotal mountings 56 for the rear door 36. The pivotal mounting 56, as shown in FIG. 8, comprises a compensating bushing 52 hung in a frame 54 from the underside of the bottom wall 29b of the overlying triangular box beam 29. The bushing 52 rotatably mounts a short shaft 50 which is rigidly secured within the torsion tube 43. The pivotal mounting device for rotatably mounting the other end of the tube 43 is identically constructed.

Above the rear door 36, the rear frame is capped by the closed triangular box beam 44 (FIG. 6) as mentioned hereinbefore. This beam generally serves the same functions as the triangular box beams 29 on the side frame structures. The upper inclined wall 44c of the triangular box beam 44 serves as the upper portion of the interior rear wall, and the rear wall 44a to the box beam 44 serves as a header plate over the door 36. The bottom wall 44b of the box beam 44 lies in a generally horizontal plane.

Figure 7:
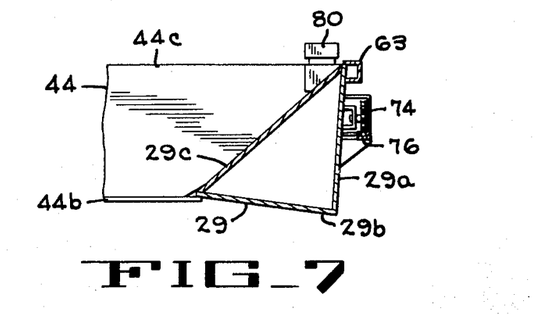
FIG. 7 is an enlarged section taken on line 7—7 of FIG. 6.

FIG. 7 is a sectional view near the left rear corner of the module builder, looking rearward along a triangular box beam 29. The bottom wall 29b of the triangular box beam 29 is slightly inclined (approximately 5°) to the horizontal, so that the inner corner of beam 29 rests upon (FIG. 7) and is welded to the bottom wall 44b of the triangular box beam 44 at the rear of the module builder. The weld line at this junction extends inwardly across the width of the bottom wall 44b of beam 44 which, in the preferred embodiment of the invention, is approximately 16–20 inches. The side walls 29a and 44a of the triangular box beams are welded together on their (approximately vertical) line of intersection. The triangular box beams 44 and 29 are thus tied together and also tied to the remainder of the side frame structure so as to increase torsional resistance of the module builder when the rear door 36 is open.

The tamper mechanism 57, shown schematically in FIGS. 4 and 9, is fairly conventional. The compacting face is provided by a platen 58 formed of two solid bars 59 which are held in parallel alignment and capped at each end by plates 65 and 67. The width of the entire end plates 65 and 67 might be 14 to 18 inches and the width of individual bars 59 is chosen to produce the desired tamping pressure (expressed in pounds per unit area) for the available tamping force. The tamping platen 58 is supported for vertical travel by means of a rectangular frame 71 which is guided by roller bearings within an A-frame structure 61 that is mounted atop the module builder.

The tamping platen 58 is raised and lowered by hydraulic means acting through a vertical rod 60 attached to a piston within a vertically positioned hydraulic cylinder 69 that is mounted for relative sliding movement within the frame 71 (FIG. 9) and that has a length corresponding to the vertical distance of travel (approximately 6 feet) of the platen. The lower end of the cylinder 69 is provided with a housing 70 for inflow and outflow of the hydraulic fluid, and the housing 70 is provided with laterally extending ears 70a (one only shown in FIG. 9) for releasable clamping engagement with structure fixed to the A-frame structure 61 (not shown, and not critical to an understanding of the present invention). The upper end of the cylinder 69 is provided with a vertically extending fitting 72 (FIG. 1) so that the hydraulic line connection will not be forced into the frame 71 when the platen is raised to its full elevated position (FIG. 4). However, when the module builder is being transported on the road, the ears 70a of the cylinder 69 may be released from engagement with the A-frame 61 and the cylinder lowered with the platen within the side walls 19 to allow the builder to pass under overpasses and other low-lying obstructions.

The supporting A-frame structure 61 is provided with four wheels 62 which move longitudinally along two rails 63 (two wheels on each rail) mounted at the top outer edge of the side box beams 29 of the frame structure (FIG. 4). The wheels 62 may have an outer bevel 64 as shown in FIG. 4, of increased radius to encourage the wheels to stay on the rails. The wheels themselves may be metal, as is conventional, or they may be solid rubber to reduce vibration and noise when the tamping mechanism is in use or when the module builder is being transported.

An endless chain 75 is attached to brackets 73 (FIGS. 1 and 4) at each side of the A-frame structure 61. Each chain 75 has an upper run (to which the A-frame is attached) for moving the tamping mechanism longitudinally along the open top of the module builder and a lower run carried by a fixed track 76 (shown in FIG. 10). Each chain is powered by a reversible motor (not shown) positioned behind a control panel 109 (FIG. 1) at the forward end of the module builder. The drive motor provides power for a drive sprocket 77 (FIG. 10) at the front end of each chain 75 by means of a laterally extending drive shaft 79. As the drive shaft 79 rotates, the sprockets 77 are turned to drive the chains 75 and move the tamping mechanism 57 forward or backward along the rails 63. The wheels 62 which support the tamping mechanism are prevented from continuing beyond the ends of the rails 63 by bumpers 80 mounted at each end of each rail (FIG. 1). At the rear end of the module builder, each chain 75 is mounted by means of an idler sprocket 74 (FIG. 7).

Figure 12:
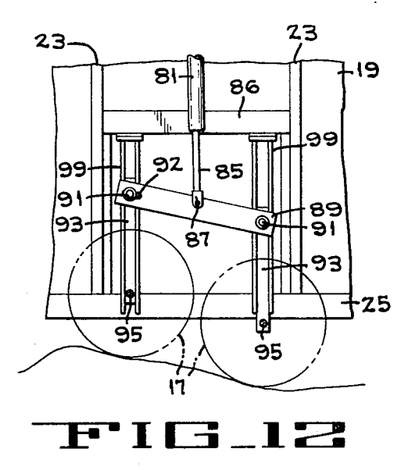
FIG. 12 is a side elevation of one of the wheel suspension means similar to FIG. 11 but showing the wheels in a "walking" position as when the module builder is traversing an incline.

FIGS. 11 and 12 illustrate the means for and the method of raising and lowering each set of wheels 17, such means comprising a walking suspension beam. A hydraulic jack 81 is provided at each side of the module builder and is attached to the adjacent frame side wall 19 at its upper end. Each jack includes a downwardly extending piston rod 85 which is rotatably attached by a clevis 87 at its distal end to the central portion of a generally horizontal beam 89. This beam 89 is, in turn, rotatably connected at its two ends by pins 91 to two parallel blocks 93, each of which is constrained for vertical sliding movement only by a pair of parallel tracks 99 which are hung from a horizontal bar 86 suspended between the two consecutive web beams 23 at the longitudinal center of the side frame structure. The blocks 93 are constrained to move vertically in the sets of tracks 99 so as to allow the two wheels 17 on either side to move vertically relative to the frame structure with the wheels being rotatably mounted by stub shafts 95 at the lower end of the blocks. By raising or lowering the piston rod 85 within the hydraulic jack 81, the wheels are raised or lowered a corresponding amount.

As shown in FIGS. 11 and 12, one of the connections of each of the beams 89 with a vertically oriented block 93 comprises an elongated slot 92 which allows the connecting pin 91 to slide during relative pivotal movement between beam 89 and block 93 so as to prevent binding. Freed from their horizontal constraint, the wheels 17 of each set move vertically relative to one another (as shown in FIG. 12) so as to permit the module builder to traverse hilly or rough terrain.

The vertical orientation of the piston rod 85 is fixed relative to the frame of the module builder, so that each wheel unit effectively pivots about the connecting pin in the clevis 87 at the end of the piston rod. The wheel units on each side of the module builder move independently of one another as the units are independently suspended. Referring to FIG. 4, it will be seen that the longitudinal center line of each hydraulic jack 81 generally coincides with the vertical plane 18 through the center of each of the connected wheels 17. This arrangement minimizes bending stresses in the side wall frame structures by transmitting the vertical force of the module builder weight from the hydraulic jacks 81 directly through the wheels 17 to the ground.

The side frame structure directly over the wheel 17 is specially reinforced with gussets 100 (FIG. 4), each of which serve to mount the upper end of the underlying hydraulic jack 81 by means of an anchor plate 83 which is rotatably secured to the end of the jack. Each gusset will be seen to comprise a vertically extending outer wall 100a, a laterally extending short wall 100b, and an inclined inner wall 100c with the anchor plate 83 being welded to the underside of the lower wall 100b. The upper edges of gusset walls 100a and 100c are welded to the lower wall 29b of the overlying triangular box beam 29. The gussets 100 span the distance between the web beam 23 at the center of the side frame structures. A reinforcing plate 98 (FIG. 4) is enclosed within the walls of each of the gussets in the plane of the associated jack 81 to strengthen the gusset at its point of highest stress. Additionally, two separate and spaced plates 96 are enclosed within and welded to the interior walls of the triangular box beams 29 forming the upper side wall structures of the module builder. The plates 96 are vertically oriented and are located just above the two web beams at the center of each side of the side wall structure in order to strengthen the frame structure at these high stress points. Additional reinforcing plates 96 may be enclosed within the box beams 29 at other points along the length of the module builder where extra strengthening is desirable.

The upper portion of the front end of the module builder is also provided with a closed triangular box beam 102 (FIG. 1) which is structurally similar to the rear box beam 44 and is rigidly connected to the side box beams 29 in the same manner the beam 44 is joined to the side box beams 29. The outer wall 102a of the box beam 102 mounts the control panel 109 for the module builder as shown in FIG. 1. The major portion of the front wall is formed by a panel 104 which is hung from and supported by the overlying beam 102.

As shown in FIG. 1, the front end of the module builder includes a superstructure which allows the operator to control the operation of the module builder through the control panel 109. The operator may mount either of a pair of ladders 103 to reach a raised platform 105 upon which is provided a chair 107 for the convenience of the operator in manipulating the module builder controls. From the platform 105, the operator is afforded a view of the entire bin into which the cotton is deposited for compression into a module. From the control panel 109, the operator can control the operation of the tamping mechanism 57, the door raising cylinder 53 at the rear of the module builder, the hydraulic jacks 81 for operation of the wheel suspension means, and the reversible motor (not shown) which controls the longitudinal movement of the tamping mechanism. A connection 106 to the tractor drive shaft may provide the power for the various hydraulic mechanism and for the reversible motor.

An important advantage of the aforedescribed apparatus, unrealized before the module builder was constructed and tested, is that the structure as shown will permit up to 30,000 pounds of cotton to be compressed into a module upon a pallet no longer than the length of the bed of the module builder. The maximum weight achievable by previous module builders of similar size was of the order of 20,000 pounds of cotton as previously noted. The higher compression achieved by the apparatus of the present invention thereby allows the apparatus to be used in another mode where the underlying pallet is eliminated and the cotton module is "ricked" directly upon the ground. Among its other advantages, this mode of practice allows one to avoid the expense of purchasing and maintaining the pallets.

Although the best mode contemplated for carrying out the present invention has been herein shown and described, it will be apparent that modification and variation may be made without departing from what is regarded to be the subject matter of the invention.

What is claimed is:

1. In a cotton handling machine comprised of frame means including side walls, and a front wall and a rear wall interconnecting said side walls, said frame means being open at the top and at the bottom thereof, and compactor means mounted on the upper portion of said frame means, said compactor means including a platen movable vertically in opposition to the ground so as to compress cotton or the like within said frame means, the improvement comprising a closed triangular frame beam secured to and forming the upper portion of each of said side walls, and closed triangular frame beams secured to and forming the upper portions of said front wall and said rear wall and interconnecting said side wall triangular frame beams whereby the torsional resistance of said frame means is increased.

2. The apparatus of claim 1, wherein said frame means includes as part of the rear wall a door extending across substantially the entire distance between said side walls, said closed triangular frame beam forming the upper portion of the rear wall above said door and interconnecting said upper portion of said side walls.

3. The apparatus of claim 2, including power means for opening and closing said door.

4. The apparatus of claim 1 including a plurality of spaced web members extending outwardly from each of said side walls, each of said web members being rigidly attached at the upper end thereof to one of the sides of one of said closed triangular frame beams.

5. The apparatus of claim 4 including a carriage for supporting said platen, two rails extending longitudinally along the outer sides of the triangular frame beams forming the upper portion of said side walls, said carriage including wheels for engaging the rails whereby the carriage is arranged to roll along the rails.

6. The apparatus of claim 5, including power means for moving said carriage and said compactor means longitudinally relative to said frame means along said rails.

7. The apparatus of claim 1, including pallet means of width no greater than the distance between said side walls, said pallet means being arranged to rest upon the ground within said frame means whereby the cotton can be compressed and stacked upon the pallet means.

8. In a cotton handling machine comprised of a generally rectangular frame structure including a pair of side walls interconnected by a front wall and a rear wall, said frame structure being open at the top and the bottom thereof and said side walls being inclined inwardly toward each other at the top edges thereof, a plurality of web members extending outwardly from each of said side walls in spaced vertical planes in order to strengthen said side walls, and compactor means mounted for longitudinal movement along the upper portion of said frame structure and including a platen movable vertically in opposition to the ground to compress cotton or the like within said frame structure; the improvement wherein said frame structure includes a plurality of rigidly interconnected beams attached to and forming an upper extension of the upper ends of said side walls and said front and rear walls, each of said beams comprising a closed tubular structure triangular in cross section, said web members being connected to said triangular beams to transfer torsional loads from said side walls to the associated triangular beams.

9. In a cotton handling machine according to claim 8 wherein said triangular beams secured above said side walls have three longitudinally extending sides with one side thereof being positioned in a generally horizontal plane and being secure to the upper edges of the associated side wall and outwardly extending web members and with a second side thereof extending in a generally vertical direction adjacent to the outer edge of each of said web members.

10. In a cotton handling machine according to claim 9 wherein each of said web members is tapered from the top to the bottom thereof, said frame structure including box beams secured to the lower edges of said side walls and associated web members.

11. In a cotton handling machine comprised of frame means having opposite side walls, and a front wall and a rear wall interconnecting said side walls, said frame means being open at the top and bottom thereof, and compactor means mounted on the upper portion of said frame means, said compactor means including a platen movable vertically in opposition to the ground so as to compress cotton or the like within said frame means, the improvement comprising independently suspended carriage means mounted to each of the side walls of the frame means, each carriage means comprising at least two wheels, each wheel being connected to an opposite end of a rotatable generally horizontal bar, means for rotatably mounting the central portion of the bar so that the wheels can move vertically relative to one another as the bar assumes a non-horizontal position, and powered lift means connected between said means for rotatably mounting said means for rotatably mounting said horizontal bar and the associated side wall whereby the carriage means may be raised or lowered relative to said side wall.

12. The apparatus of claim 11, wherein said connections of said wheels to said generally horizontal bar comprise a pair of vertical bars each of which is rotatably connected at its upper end to said rotatable, generally horizontal bar and is connected at its lower end to one of said two wheels.

13. The apparatus of claim 12 including means constraining said second and third vertical bars to move only vertically relative to said frame means.

* * * * *

UNITED STATES PATENT OFFICE
CERTIFICATE OF CORRECTION

PATENT NO. : 3,941,047
DATED : March 2, 1976
INVENTOR(S) : Franklin P. Orlando, et al It is certified that error appears in the above-identified patent and that said Letters Patent are hereby corrected as shown below:

Column 2, line 44, "walking" should be --"walking--.

Column 2, line 45, "beam" should be --beam"--.

Column 4, line 68, "closed" should be --<u>closed</u>--.

Column 5, line 65, "to" should be --of--.

Column 7, line 19, insert quote marks before "walking" and after "beam".

Signed and Sealed this

Twenty-seventh Day of July 1976

[SEAL]

Attest:

RUTH C. MASON
*Attesting Officer*

C. MARSHALL DANN
*Commissioner of Patents and Trademarks*